Feb. 25, 1947.  W. R. HENDRIX  2,416,388
SUSPENSION MECHANISM FOR VEHICLES
Filed April 20, 1943
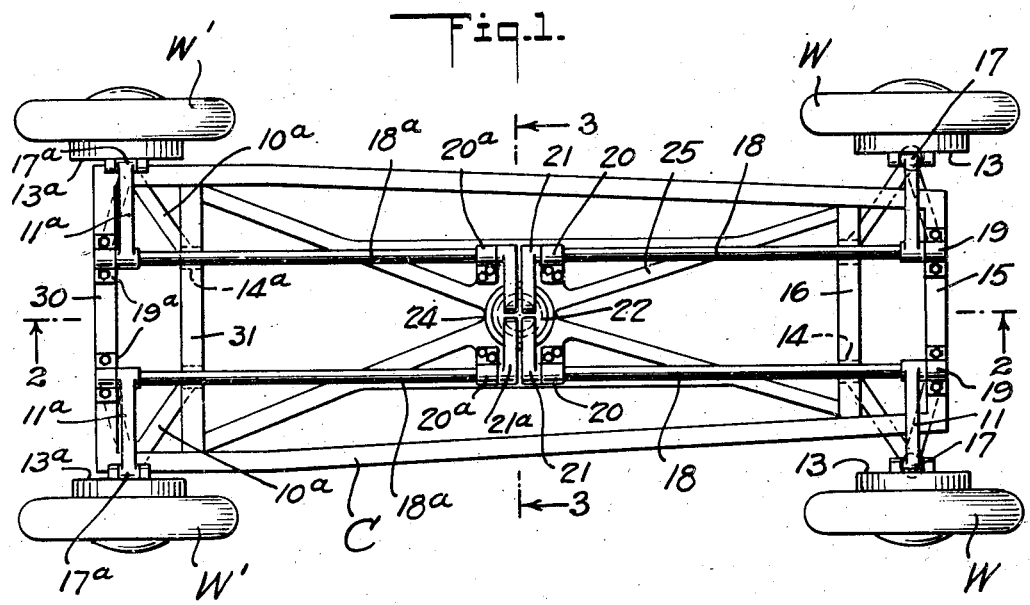
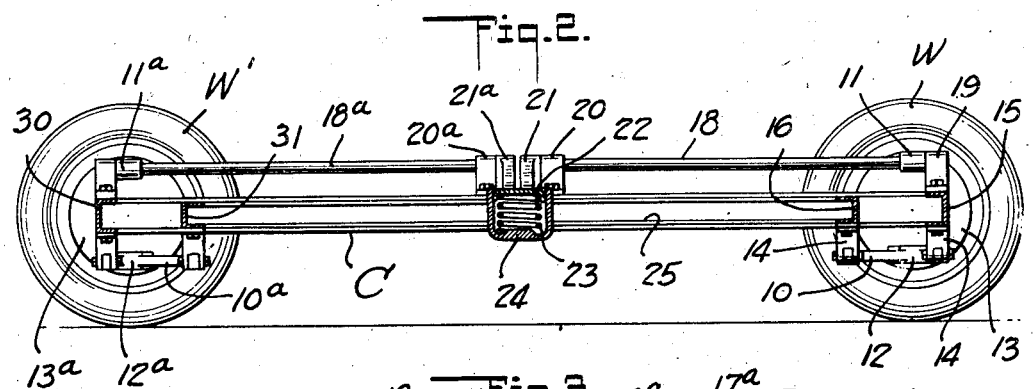
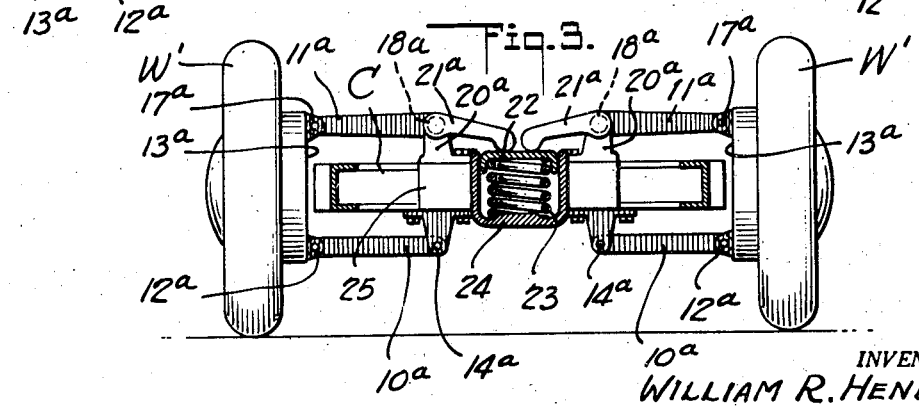
INVENTOR.
WILLIAM R. HENDRIX
BY
Frederick Diehl
ATTORNEY Patented Feb. 25, 1947

2,416,388

UNITED STATES PATENT OFFICE 2,416,388

SUSPENSION MECHANISM FOR VEHICLES

William R. Hendrix, Long Beach, Calif.

Application April 20, 1943, Serial No 483,808

2 Claims. (Cl. 267—14)

1

This invention relates generally to vehicles, and more particularly to spring suspension mechanisms therefor.

An object of this invention is to provide a spring suspension mechanism, which, in its association with a vehicle such as an automobile, truck, or other wheeled vehicle, operates to suspend the chassis in such manner as to eliminate longitudinal pitching and lateral motion or sideway of the body relative to the wheels, and to automatically stabilize the body against road shocks and surface inequalities variably acting vertically and/or horizontally upon the wheels individually or otherwise, whereby to impart smooth and cushioned riding qualities to the vehicle so that it will afford comfortable transportation for its occupants.

Another object of the invention is to provide a mechanism of the above described character which embodies simplicity of construction, reduces unsprung weight to a minimum, produces a low center of gravity and enables either a knee action or rigid type of axle to be used.

A further object of the invention is to provide a spring suspension mechanism structurally characterized specifically by a single resilient means such as a relatively strong spring common to all wheels, which spring is so located on the chassis and operatively connected by power transferring means to the wheels of the vehicle, that vertical movement of the wheels will be synchronized or rendered interdependent in such manner that the chassis will be maintained in a substantially level position with all major road shocks absorbed by the spring, and with minor road shocks absorbed by converting same into torque stresses which react elastically upon the power transferring means.

With these and other objects in view, the invention resides in the combinations and arrangements of elements as set forth in the following specification and particularly pointed out in the appended claims.

In the accompanying drawing,

Figure 1 is a plan view of one form of suspension mechanism for vehicles embodying this invention, applied to the chassis of an automobile;

Figure 2 is a vertical longitudinal sectional view taken on the line 2—2 of Figure 1;

Figure 3 is an enlarged vertical sectional view taken on the line 3—3 of Figure 1.

Referring specifically to the drawing, the invention in its illustrated embodiment is shown associated with the chassis C of an automobile to suspend the body of the vehicle from the front and rear wheels W and W' respectively, it being understood that any suitable power plant, body and essential mechanisms for operation of the vehicle (not shown) can be provided in accordance with a selected design of vehicle.

For the purpose of this invention the front wheels W are each mounted for vertical movement on the chassis C by pairs of parallelogrammic links 10 and 11, the links 10 constituting fore and aft brace members by being constructed of two diverging arms whose joined ends are connected at 12 to the brake housing 13 of the respective front wheel, by ball and socket or universal joints, to permit steering movements of the front wheels to be effected. The free ends of these link arms are mounted at 14 for pivotal movement about longitudinally alined axes on the cross members 15 and 16 of the chassis C to work beneath the latter.

The links 11 constitute actuating members and are connected at one end by ball and socket or universal joints 17 to the brake housing 13 of the respective wheel, so that the front wheels will be free for steering movements. The other ends of the links 11 are rigidly secured to the forward ends of rock shafts 18 arranged in parallelism at opposite sides of the longitudinal center line of the chassis and journaled in bearings 19 and 20 on the chassis as clearly shown in Figure 1.

Secured to the rear ends of the shafts 18 are arms 21, the free ends of which bear upon a cap 22 resting on a resilient element in the form of a relatively strong coil spring 23 constituting a single resilient supporting means common to all wheels. The spring 23 seats in a cup 24 slidably receiving the cap 22 and formed integral with or rigidly secured to an X frame member 25 forming a rigid portion of the chassis C, the cup 24 being disposed at the intersection of the arms of the member 25 and in intersecting relation to the longitudinal axis of the chassis, as will be clear from Figure 1.

The rear wheels W' are mounted by similar power transferring mechanism for vertical movement on the chassis C, and composed of pairs of parallelogrammic links 10a and 11a. The links 10a constitute fore and aft brace members and are constructed of two diverging arms whose joined ends are pivotally connected at 12a to the brake housing 13a of the respective rear wheels W'. The free ends of these link arms are mounted at 14a for pivotal movement about longitudinally alined axes on the cross members 30 and 31 of the chassis C to work beneath the latter.

The links 11a constitute actuating members and are pivotally connected at one end to the brake housing 13a at a point vertically above the connection 14a as indicated at 17a in Figure 3. The other ends of the links 11a are rigidly secured to the rear ends of rock shafts 18a alined with the shafts 18 and journaled in bearings 19a and 20a on the chassis C as shown in Figure 1.

Secured to the forward ends of the shafts 18a are arms 21a, the free ends of which bear upon the cap 22, it being noted that all four arms 18, 18, 18a and 18a engage the cap 22 as close as practicable to the center of the latter so as to function in a manner to be described in the operation of the invention which is as follows:

In a vehicle equipped with the invention, and with the spring 23 loaded to a predetermined extent, it will exert a downwardly yielding force upon all wheels W and W' to resiliently suspend the body of the vehicle from the wheels. Any major road shock to which a wheel is subjected will react upon the spring 23 to increase the loading of the spring in the case of the wheel striking a bump, or to decrease the spring loading in the event of the spring striking a rut, thus permitting the spring in one case or the other to accordingly lower or raise the body uniformly at all wheels so as to maintain a level condition of the body.

Likewise, in negotiating a curve, the body of the vehicle tends to tilt outwardly of the curve under the action of centrifugal force, thus forcing the outside wheels upwardly relative to the body. As this action compresses the spring 23, the inside wheels also move upwardly relative to the body so as to automatically compensate for the tilting tendency and maintain a level condition of the body. A similar action results from any end to end tilting of the body so that the latter is maintained level under any and all conditions.

The shafts 18 and 18a have sufficient elasticity to absorb minor road shocks, by becoming torsionally stressed in response to relatively small turning moments imposed thereon from small road surface inequalities to which the wheels are subjected, thus insuring smooth comfortable riding qualities as well as freeing the vehicle of all undesirable pitching and sidesway.

It will be noted that the location of the spring 23 may be shifted forwardly or rearwardly of a central location on the chassis, to increase or decrease the lengths of the shafts 18 or 18a and thus vary the relative torsional elasticity thereof in response to road shocks imposed on the front or rear wheels.

I claim:

1. In a wheeled vehicle, a spring seat on the vehicle body; a compression coil spring mounted on said seat; a cap on said spring; shafts one for each wheel, journaled on the body; arms fixed to said shafts and bearing on the cap, to co-act in loading said spring in response to rotational movement of the shafts in one direction; and parallelogrammic pairs of links for each wheel, mounting same for movement vertically relative to the body; one link of each pair being fixed to the respective one of said shafts for co-action in transmitting vertical movement of the respective wheel to said spring.

2. In a wheeled vehicle, a spring seat on the vehicle body; a compression coil spring mounted on said seat; a cap on said spring; shafts, one for each wheel, journaled on the body; arms fixed to said shafts and bearing on the cap, to co-act in loading said spring in response to rotational movement of the shafts in one direction; and parallelogrammic pairs of links for each wheel, mounting same for movement vertically relative to the body; one link of each pair being fixed to the respective one of said shafts for co-action in transmitting vertical movement of the respective wheel to said spring; said arms and said ones of the links being fixed to the respective shafts at relatively remote locations along the lengths of the shafts so as to utilize torsional elasticity of the shafts in absorbing road shocks.

WILLIAM R. HENDRIX.

REFERENCES CITED

The following references are of record in the file of this patent:

UNITED STATES PATENTS

| Number | Name | Date |
|---|---|---|
| 2,096,060 | Perron | Oct. 19, 1937 |
| 2,254,822 | Johnson | Sept. 2, 1941 |
| 2,191,211 | Krotz | Feb. 20, 1940 |
| 360,200 | Bowe | Mar. 29, 1887 |
| 374,441 | Apple et al. | Dec. 6, 1887 |
| 375,603 | Cassity | Dec. 27, 1887 |
| 391,493 | Swan | Oct. 23, 1888 |
| 393,171 | Norfolk | Nov. 20, 1888 |

FOREIGN PATENTS

| Number | Country | Date |
|---|---|---|
| 835,481 | French | Sept. 26, 1938 |